United States Patent
Nalam

(10) Patent No.: US 12,443,170 B2
(45) Date of Patent: Oct. 14, 2025

(54) ORCHESTRATION OF A PATTERN-BASED CONFIGURABLE PROCESS SEQUENCE

(71) Applicant: Kyndryl, Inc., New York, NY (US)

(72) Inventor: Kishore Vnts Nalam, Hyderabad (IN)

(73) Assignee: Kyndryl, Inc., New York, NY (US)

(*) Notice: Subject to any disclaimer, the term of this patent is extended or adjusted under 35 U.S.C. 154(b) by 407 days.

(21) Appl. No.: 18/113,000

(22) Filed: Feb. 22, 2023

(65) Prior Publication Data
US 2024/0280973 A1   Aug. 22, 2024

(51) Int. Cl.
*G05B 19/418* (2006.01)
*G06F 11/34* (2006.01)

(52) U.S. Cl.
CPC ... *G05B 19/41835* (2013.01); *G05B 19/4184* (2013.01); *G05B 19/41845* (2013.01); *G05B 19/41865* (2013.01); *G05B 19/41875* (2013.01); *G05B 19/4188* (2013.01); *G06F 11/3466* (2013.01); *G06F 11/3476* (2013.01)

(58) Field of Classification Search
CPC .......... G05B 19/41835; G05B 19/4184; G05B 19/41845; G05B 19/41865; G05B 19/41875; G05B 19/4188; G06F 11/3466; G06F 11/3476
See application file for complete search history.

(56) References Cited

U.S. PATENT DOCUMENTS

| | | | |
|---|---|---|---|
| 10,708,135 B1 | 7/2020 | Elliott, IV | |
| 2019/0317761 A1 | 10/2019 | Gade et al. | |
| 2020/0258102 A1 | 8/2020 | Bs et al. | |
| 2020/0306970 A1* | 10/2020 | Latkar | G06F 11/0766 |
| 2020/0372367 A1* | 11/2020 | Ha | G06N 3/088 |

(Continued)

FOREIGN PATENT DOCUMENTS

KR     102198104 B1 *  1/2021

OTHER PUBLICATIONS

Ansible Tower User Guide v3.8.6, Red Hat, Inc., Feb. 11, 2023, 317 pages, [retrieved on May 28, 2025], Retrieved from the Internet: <URL:https://docs.ansible.com/ansible-tower/3.8.6/pdf/AnsibleTowerUserGuide.pdf>.*

(Continued)

*Primary Examiner* — Geoffrey R St Leger
(74) *Attorney, Agent, or Firm* — CANTOR COLBURN LLP; Erik Swanson

(57) ABSTRACT

A computer-implemented method, according to one approach, includes causing a predetermined tracker component to create a template tracker file based on a pattern-based configurable process sequence and causing a predetermined logger component to create a log of the pattern-based configurable process sequence. A playbook is generated based on the pattern-based configurable process sequence. The method further includes storing the template tracker file, a file including the log, and the playbook in storage for enabling auditing of the pattern-based configurable process sequence. A computer program product, according to another approach, includes a computer readable storage medium having program instructions embodied therewith. The program instructions are executable by a computer to cause the computer to perform the foregoing method.

23 Claims, 5 Drawing Sheets

(56) References Cited

U.S. PATENT DOCUMENTS

2022/0091826 A1    3/2022    Collins et al.
2022/0197870 A1*   6/2022    Yamamoto .......... G06F 16/1805

OTHER PUBLICATIONS

Malak, H., "7 Best Business Process Management Tools (2023)," The ECM Consultant, Jan. 1, 2023, 37 pages, retrieved from https://theecmconsultant.com/best-business-process-management-tools/.

Wikipedia, "Jenkins (software)," Wikipedia, 2022, 6 pages, retrieved from https://en.wikipedia.org/wiki/Jenkins_(software).

Github, "Understanding GitHub Actions," GitHub Docs, 2023, 13 pages, retrieved from https://docs.github.com/en/actions/learn-github-actions/understanding-github-actions.

Wikipedia, "ServiceNow," Wikipedia, 2023, 5 pages, retrieved from https://en.wikipedia.org/wiki/ServiceNow.

* cited by examiner

```
"2021-11-29-17-51-21 INFO: eamoperatingsystem71676 Process started with job ID 71676.",  ← 452
"2021-11-29-17-51-21 INFO: eamoperatingsystem71676 Step 1 Job Template 1473 Execution Started with job ID 71678.",  ← 454
"2021-11-29-17-52-03 INFO: eamoperatingsystem71676 Step 1 Job Template 1473 Successfully Execution with job ID 71678.",  ← 456
"2021-11-29-17-52-04 INFO: eamoperatingsystem71676 Step 1 Copy Tracker and Logger files to reporting server after execute workflow 1473.",  ← 458
"2021-11-29-17-52-14 INFO: eamoperatingsystem71676 Step 1 Both Tracker and Logger files copied successfully to reporting server.",  ← 460
"2021-11-29-17-52-17 INFO: eamoperatingsystem71676 Step 2 Job Template 1518 Execution Started with job id 71680.",  ← 462
"2021-11-29-17-52-48 INFO: eamoperatingsystem71676 Step 2 Job Template 1518 Successfully Executed with job id 71680.",  ← 464
```

ORCHESTRATION OF A PATTERN-BASED CONFIGURABLE PROCESS SEQUENCE

BACKGROUND

The present invention relates to process automation, and more specifically, this invention relates to pattern-based configurable process sequences.

Processes automation includes using software to automate process steps, e.g., of a business practice, a manufacturing process, etc. Conventional techniques pertaining to process automation include using ANSIBLE playbooks and ANSIBLE tower. In some ANSIBLE playbook and/or ANSIBLE tower applications, a process includes a disconnected automation step in a sequence of steps which is either manual or supported by different automation tool results in manual handover and with human effort involved. However, these conventional techniques associated with ANSIBLE tower fail to provide a configurable way to notify a specific group or a specific user to act upon a failure occurring with respect to one or more steps of the process, e.g., such as where a different technology team is already responsible for performing such action but has failed to do so.

These conventional techniques associated with ANSIBLE tower also fail to provide a method with respect to how ANSIBLE can be used to orchestrate a process containing multiple automated steps, unautomated steps with a clear error management strategy, and pause-resume steps automated using a different tool. There is no known prior art pertaining to ANSIBLE tower or ANSIBLE that provides a configurable way to orchestrate ANSIBLE roles, ANSIBLE tower job templates, ANSIBLE tower workflow job templates and unautomated steps. Due to this, a number of real life challenges are encountered to which there is no known solution. In some applications, processes are often stitched together using external tools. However, this stitching process is inefficient and expensive based on, e.g., such tools requiring licenses to be acquired, a learning curve existing within such stitching techniques, human interaction being required which is expensive, maintenance requirements of another set of infrastructure either on-premises or on cloud, etc. These stitching processes are not feasible in relatively large scale environments as the expenses associated with the stitching process result in extra costs being passed on to customers, thereby resulting in customer dissatisfaction. Accordingly, there is a deficiency and longstanding need within the field of process automation for scalable techniques that automate process steps in a cost and resource efficient manner that do not call for ongoing maintenance over time.

SUMMARY

A computer-implemented method, according to one approach, includes causing a predetermined tracker component to create a template tracker file based on a pattern-based configurable process sequence. Status information obtained by the predetermined tracker component is stored in the template tracker file. This ensures that the status for steps of the pattern-based configurable process sequence is available, e.g., for auditing purposes. The information of the tracker file also enables corrective steps to be performed in response to a determination that a failure has occurred during performance of the steps of the pattern-based configurable process sequence. This is useful for improving performance of computer systems associated with performing these steps.

The method further includes causing a predetermined logger component to create a log of the pattern-based configurable process sequence. The log preferably includes timestamps associated with the steps of the pattern-based configurable process sequence. These associated timestamps act as a reference for auditing purposes and enable useful metrics to be determined. For example, these associated timestamps allow information associated with performance of the steps of the pattern-based configurable process sequence to be audited according to one or more specified temporal parameters.

A playbook based on the pattern-based configurable process sequence is generated. The playbook defines the steps of the pattern-based configurable process sequence, as well as automated actions described elsewhere herein for reducing an amount of human interaction that is involved with performance of the steps. The template tracker file, a file including the log, and the playbook are stored in storage for enabling auditing of the pattern-based configurable process sequence. Queries that are received to thereby audit the stored information are provided with detailed information about the steps of the pattern-based configurable process sequence.

The method further includes inputting the pattern-based configurable process sequence into a predetermined platform and causing a predetermined automation generator to read the pattern-based configurable process sequence in response to the pattern-based configurable process sequence being input into the predetermined platform. As a result of reading the pattern-based configurable process sequence the automation generator is able to be caused to orchestrate steps of the pattern-based configurable process sequence into logical building blocks. These logical building blocks define targets that may be tracked for mining status information, log information, etc., for auditing purposes.

A computer program product, according to another approach, includes a computer readable storage medium having program instructions embodied therewith. The program instructions are executable by a computer to cause the computer to perform the foregoing method.

A system, according to another approach, includes a hardware processor, and logic integrated with the processor, executable by the processor, or integrated with and executable by the processor. The logic is configured to perform the foregoing method.

Other aspects and approaches of the present invention will become apparent from the following detailed description, which, when taken in conjunction with the drawings, illustrate by way of example the principles of the invention.

BRIEF DESCRIPTION OF THE DRAWINGS

FIG. 4B is a representation an audit trail of the flowchart of FIG. 4A, in accordance with one approach of the present invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for enabling orchestration of a pattern-based configurable process sequence.

In one general approach, a computer-implemented method includes causing a predetermined tracker component to create a template tracker file based on a pattern-based configurable process sequence and causing a predetermined logger component to create a log of the pattern-based configurable process sequence. A playbook is generated based on the pattern-based configurable process sequence. The method further includes storing the template tracker file, a file including the log, and the playbook in storage for enabling auditing of the pattern-based configurable process sequence.

In another general approach, a computer program product includes a computer readable storage medium having program instructions embodied therewith. The program instructions are executable by a computer to cause the computer to perform the foregoing method.

In another general approach, a system includes a hardware processor, and logic integrated with the processor, executable by the processor, or integrated with and executable by the processor. The logic is configured to perform the foregoing method.

Figure 1:
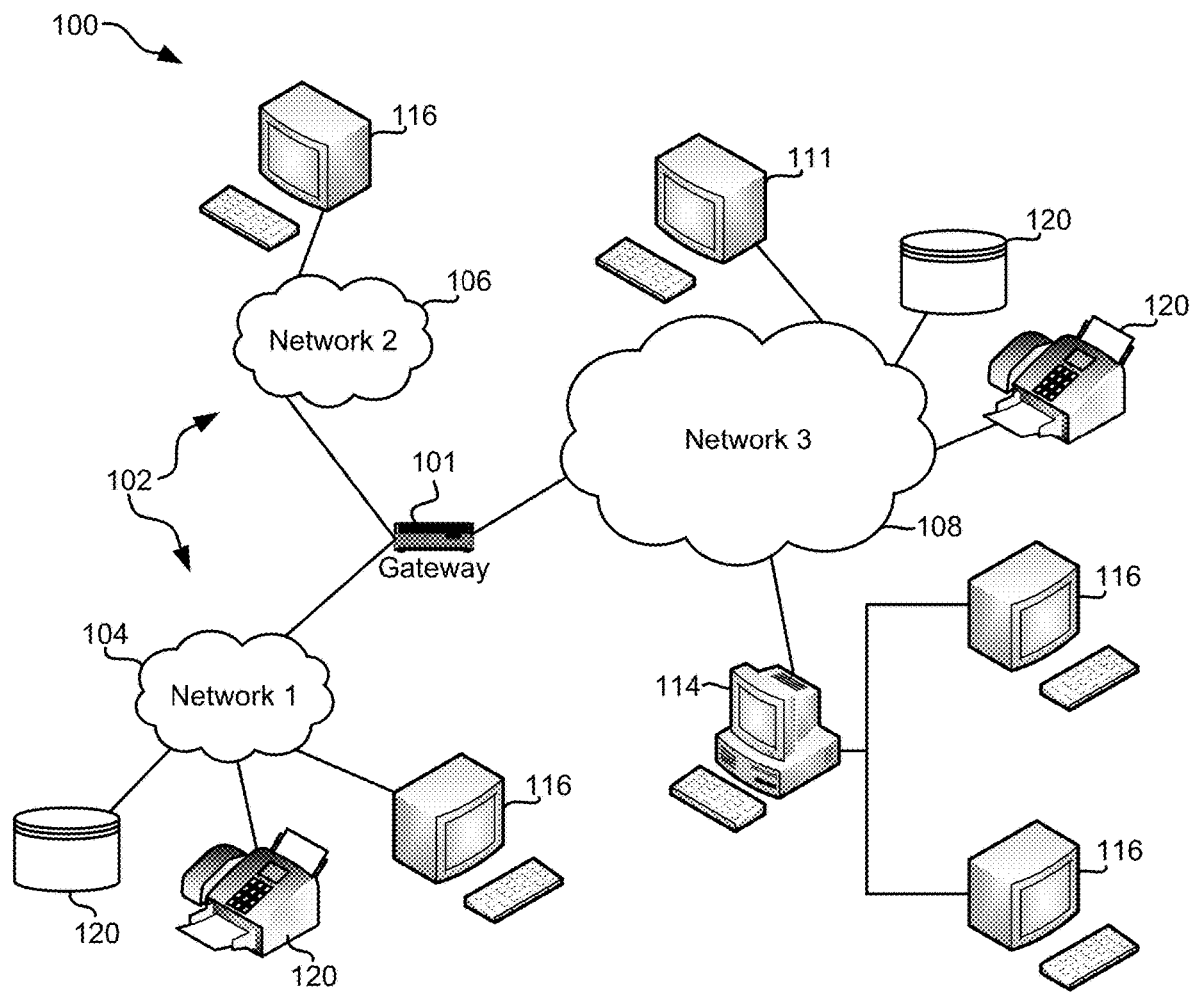
FIG. 1 is a diagram of a network architecture, in accordance with one approach of the present invention.

FIG. 1 illustrates an architecture 100, in accordance with one approach. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one approach.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some approaches.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
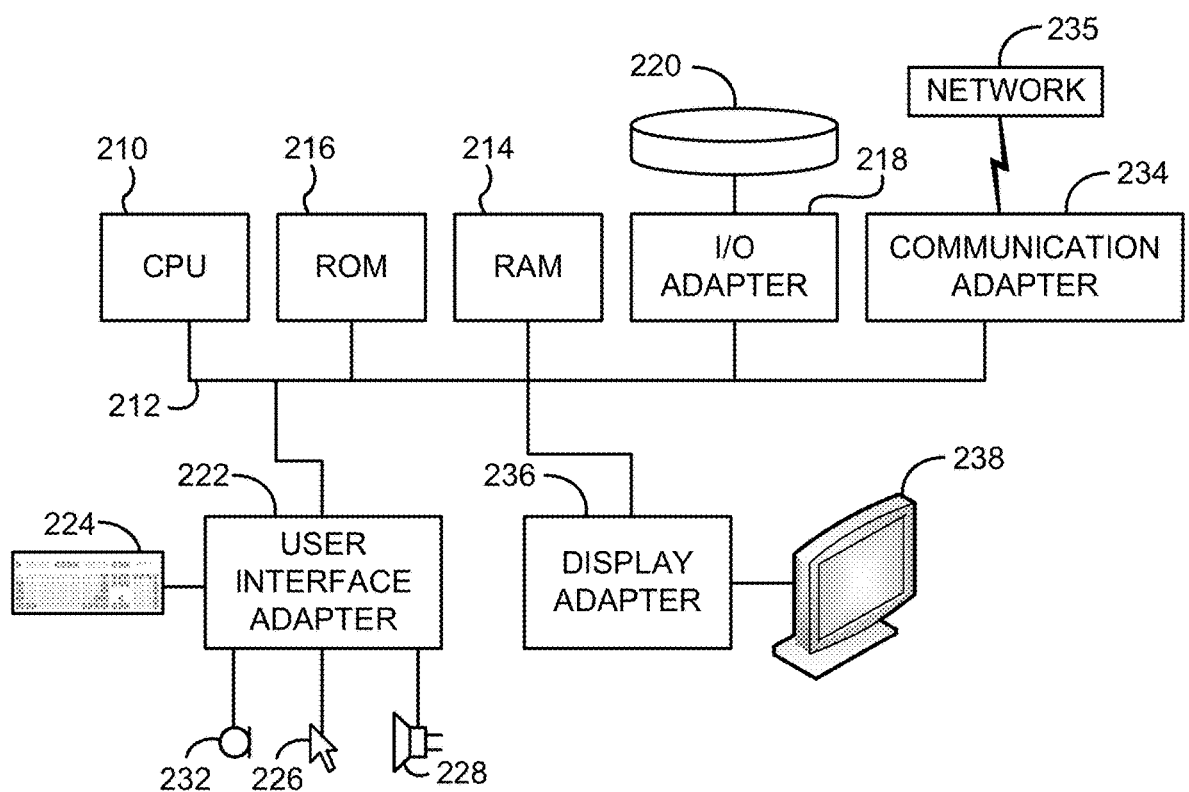
FIG. 2 is a diagram of a representative hardware environment that may be associated with the servers and/or clients of FIG. 1, in accordance with one approach of the present invention.

FIG. 2 shows a representative hardware environment associated with a user device 116 and/or server 114 of FIG. 1, in accordance with one approach. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred approach may also be implemented on platforms and operating systems other than those mentioned. A preferred approach may be written using extensible Markup Language (XML), C, and/or C++ language, or other programming languages, along with an object oriented programming methodology. Object oriented programming (OOP), which has become increasingly used to develop complex applications, may be used.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some approaches, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to approaches of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various approaches of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

As previously mentioned elsewhere herein, processes automation includes using software to automate process steps, e.g., of a business practice, a manufacturing process, etc. Conventional techniques pertaining to process automation include using ANSIBLE playbooks and ANSIBLE tower. In some ANSIBLE playbook and/or ANSIBLE tower applications, a process includes a disconnected automation step in a sequence of steps which is either manual or supported by different automation tool results in manual handover and with human effort involved. However, these conventional techniques associated with ANSIBLE tower fail to provide a configurable way to notify a specific group or a specific user to act upon a failure occurring with respect to one or more steps of the process, e.g., such as where a different technology team is already responsible for performing such action but has failed to do so.

These conventional techniques associated with ANSIBLE tower also fail to provide a method on how ANSIBLE can be used to orchestrate a process containing multiple automated steps, unautomated steps with a clear error management strategy, and pause-resume steps automated using a different tool. There is no known prior art pertaining to ANSIBLE tower or ANSIBLE that provides a configurable way to orchestrate ANSIBLE roles, ANSIBLE tower job templates, ANSIBLE tower workflow job templates and unautomated steps. Due to this, a number of real life challenges are encountered to which there is no known solution. In some applications, processes are often stitched together using external tools. However, this stitching process is inefficient and expensive based on, e.g., such tools requiring licenses to be acquired, a learning curve existing within such stitching techniques, human interaction being required which is expensive, maintenance requirements of another set of infrastructure either on-premises or on cloud, etc. These stitching processes are not feasible in relatively large scale environments as the expenses associated with the stitching process result in extra costs being passed on to customers, thereby resulting in customer dissatisfaction.

Accordingly, there is a deficiency and longstanding need within the field of process automation for scalable techniques that automate process steps in a cost and resource efficient manner that do not call for ongoing maintenance over time. It may also be noted that a reason that ANSIBLE tower workflow job templates cannot be used to address the deficiencies explained above is because such templates need to be customized for every process automation requirement and the same process can have different sequence of steps with varied business needs. The reason that ANSIBLE tower workflow job templates make this complex is because the number of workflow job templates relatively quickly grows to an unmanageable number based on these varied business needs. This in turn defeats the purpose of creating such templates. This complexity is also caused by a need to create detailed documentation about each workflow job template, which make the templates relatively very mundane to maintain overtime. Furthermore, a reason that ANSIBLE tower workflow job templates cannot be used is because they do not include a directed user notification capability and require individual workflow job template approval role-based access control (RBAC) roles to respective users. This requires a one-to-one mapping between user roles and job templates which is relatively computationally unmanageable within the context of user re-validation exercises. Yet another reason that ANSIBLE tower workflow job templates or job templates cannot be used for remedying the deficiencies described above is because ANSIBLE tower workflow job templates and job templates do not have intelligence to orchestrate based on error codes, and instead only are able to realize success and/or failure.

In sharp contrast to the deficiencies of the conventional techniques described above, various approaches described herein present a novel and relatively highly effective pattern-based orchestration techniques to conform together automated steps using ANSIBLE roles, ANSIBLE job templates, ANSIBLE workflow job templates, unautomated steps or steps automated using different tools into a logical processable sequence. The logical processable sequence is configurable and provides error management capabilities as well as auditability on changes that occur on a targeted endpoint with clear timestamps. Furthermore, these novel techniques establish a framework which will allow users to create an end-end pattern-based process automation via re-usable existing automation within ANSIBLE tower without any use of external orchestration tools, provide error management, enable directed user notification via any integrated external messaging system to give a single pane interface to monitor the process execution, enable notifications in response to a determination that user attention of a particular user is required by the paused process. These techniques also provide insights into the process automation about effectiveness and wait time against manual steps which helps further streamline the process.

Figure 3:
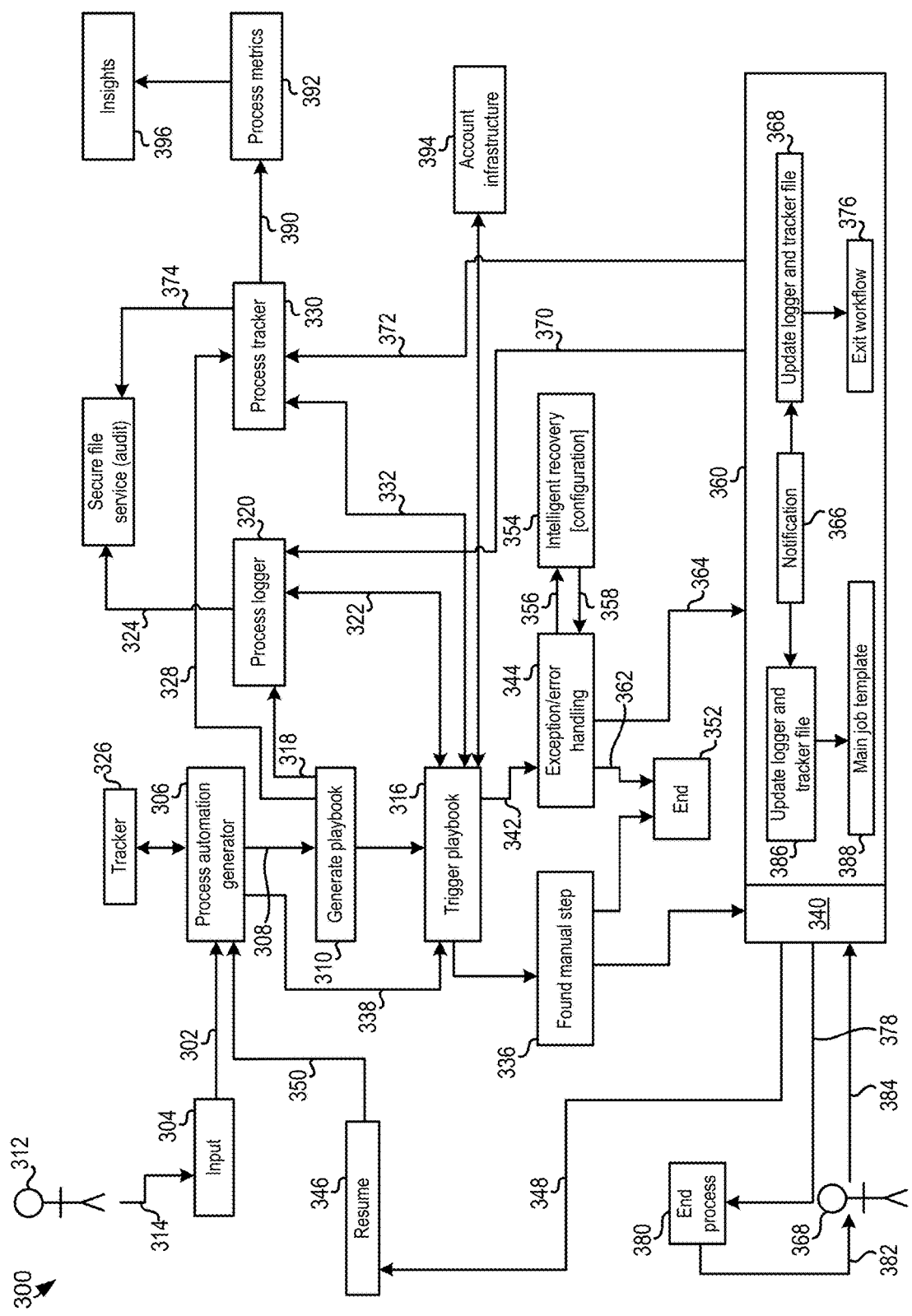
FIG. 3 is a flowchart of a method, in accordance with one approach of the present invention.

Now referring to FIG. 3, a flowchart of a method 300 is shown, according to one approach. The method 300 may be performed in accordance with the present invention in any of the environments depicted in FIGS. 1-4B, among others, in various approaches. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various approaches, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Operation 302 includes causing a pattern-based configurable process sequence to be input as input 304 into a predetermined platform. For context, the pattern-based configurable process sequence may include a series of steps of a predetermined process. For example, the predetermined process may include, e.g., a manufacturing process, a computer security process, a business process, a process in which predetermined computer code operations are executed as steps as part of a process, etc. According to a more specific approach, at least some of the steps of the pattern-based configurable process sequence may be steps that are automatically defined, e.g., by a predetermined process automation generator into an ANSIBLE process. The platform may, in some approaches, be a predetermined physical computer execution component and/or virtual component. In some approaches, the platform includes and/or is configured to communicate with one or more components, e.g., a predetermined tracker component, a predetermined logger component, a predetermined automation generator component, etc., used in method 300.

The pattern-based configurable process sequence may, in some approaches, be input into the predetermined platform in response to a determination that a predetermined command has been received from a user device associated with an executor 312, e.g., see operation 314. For example, in some approaches, the command may include a known type of file, e.g., process_automation_wrapper.yml. Upon being input into the predetermined platform, techniques described below enable orchestration of the pattern-based configurable process sequence. For context, such "orchestration" includes automating steps of the pattern-based configurable process sequence by establishing a playbook for performing the steps, and generating an auditable file detailing information associated with the performance of such steps.

In some approaches, a predetermined automation generator 306 of the predetermined platform may be caused, e.g., instructed, to read the pattern-based configurable process sequence in response to the pattern-based configurable process sequence being input into the predetermined platform. For example, in some approaches, the pattern-based configurable process sequence may be represented by computer code, that is caused to be read by the predetermined platform. In another approach, a location and/or environment architecture in which steps of the pattern-based configurable process sequence are executed may be identified, and the predetermined platform may be caused to observe the location and/or environment architecture for at least a predetermined amount of time. Method 300, in some approaches, additionally includes causing the automation generator to orchestrate steps of the pattern-based configurable process sequence into logical building blocks with respective error management and notification. For example, in one of such approaches, the automation generator component may be caused to create a logically orchestrated sequence of steps in a manner which equips the process with error management and pause-resume capabilities. In some approaches, subsequent to identifying the steps from the pattern-based configurable process sequence, orchestration of the steps of the pattern-based configurable process sequence into logical building blocks may include generating a runtime orchestration playbook 310 based on the pattern-based configurable process sequence, e.g., see operation 308. Accordingly, the steps of the pattern-based configurable process sequence may be added to, and thereby included in, the runtime orchestration playbook. It should be noted that, although various approaches described herein are described with respect to a generated playbook, e.g., the runtime orchestration playbook 310, in some approaches, such operations may additionally and/or alternatively be performed with respect to a runbook.

The generated playbook may be triggered to be performed, e.g., see operation 316. The playbook may be triggered by one or more triggers, e.g., in response to receiving a request from a user device associated with an admin, in response to a determination that a predetermined set of conditions are met, in response to a determination that a predetermined amount of time has passed since a last performance of steps of the playbook, in response to receiving a command from the process automation generator (see operation 338), etc. In some approaches, the playbook may be triggered to be performed by adding at least some steps of the generated playbook into a computer execution queue.

As a result of defining the steps of the pattern-based configurable process sequence as logical building blocks added to a playbook, the steps of the pattern-based configurable process sequence may thereafter be monitored for ensuring that the pattern-based configurable process sequence is successfully performed, and in the event that the pattern-based configurable process sequence is not properly executed, corrective actions may be taken, e.g., as will be described in greater detail elsewhere below.

In response to a determination that the pattern-based configurable process sequence is input into the predetermined platform, in some approaches, a predetermined tracker component 326 may be caused, e.g., by an instruction issued to the predetermined automation generator of the predetermined platform, to create a template tracker file based on a pattern-based configurable process sequence, e.g., see operation 328 and operation 332 input state information into tracker component file 330. In some other approaches, the template tracker file may additionally and/or alternatively be created by the process automation generator. For context, predetermined information may be logged and added to the tracker file by a predetermined tracker component that is configured to keep track of success and/or failure of each step of the pattern-based configurable process sequence. For example, in some approaches, the predetermined tracker component may be configured to monitor an execution of steps of the pattern-based configurable process sequence, and determine, e.g., subsequent to an attempted performance of each step, whether the step is successfully performed, or a failure has occurred. Information used to make such a determination, e.g., such as performance metrics of a computer device that is performing the step, throughout metrics, I/O operation processing completion time, etc., may be added to the tracker file by the tracker component. This success and/or failure of each step may then be added as entries to the tracker file. For example, in some preferred approaches, method 300 includes instructing the predetermined tracker component to log a status for each of the steps based on data obtained by the predetermined tracker component. In one approach, the status may indicate that a first of the steps is successfully performed by, e.g., a known type of certificate of proof of the completion, a timestamp of initiation of the first step and a timestamp of completion of the first step, an output of performance of the first step, verification from another component involved in the performance of the step that verifies that the step was successfully performed, etc. In another approach, the status may indicate that a second of the steps is unsuccessfully performed by, e.g., a known type of failure flag in the tracker file, a timestamp of initiation of the second step, a lack of an output of performance of the second step, verification from another component involved in the performance of the step that verifies that the step was unsuccessfully performed, etc. In yet some other approaches, the tracker file may include an indication that one or more steps of the pattern-based configurable process sequence are "in progress," for at least a duration that the one or more steps are in progress.

However, in response to a determination that the one or more steps are still in progress after a predetermined amount of time, it may be determined that the one or more steps have failed, and an indication of the failure may be added to the tracker file.

Storing status information obtained by the predetermined tracker component in the template tracker file ensures that the status for each of the steps is available, e.g., for auditing purposes. As will be described in greater detail elsewhere below, the information of the tracker file may be used to cause corrective steps to be performed in response to a determination that a failure has occurred during performance of steps of the pattern-based configurable process sequence. This is useful for improving performance of computer systems associated with performing these steps. For example, it may be noted that techniques of conventional approaches do not provide statuses and information specific to steps of an automated process. Without such information, recovery from an automated process failure otherwise requires significantly more processing operations and troubleshooting to first identify a root cause of a failure of an automated process, and then identify a cause of such failure.

As will now be described below, information associated with performance of the steps of the pattern-based configurable process sequence may be added to a file, similar to the logging of statuses described above.

Operation 318 includes causing, e.g., instructing, a predetermined logger component 320 to create a verbose log of the pattern-based configurable process sequence. For context, a "verbose" log may include a predefined amount of information that is logged by a predetermined process logger component. In some preferred approaches, the log includes timestamps associated with the steps. These associated timestamps act as a reference for auditing and enable useful metrics from the process to be determined. For example, these associated timestamps allow information associated with performance of the steps of the pattern-based configurable process sequence to be audited according to one or more specified temporal parameters. This reduces an amount of computer processing operations that would otherwise be performed while inspecting information of an automated process using conventional techniques, because information that falls outside of a specified temporal parameter is not considered in an audit.

The log may additionally and/or alternatively include predetermined metrics associated with the pattern-based configurable process sequence. In one of such approaches, the metrics include manual actions performed during an offline state of the predetermined platform. Note that "states" of the predetermined platform will be described in greater detail elsewhere below. In another of such approaches, the metrics may additionally and/or alternatively include an identification of user(s) who performed the manual actions in an offline state of the predetermined platform. In another of such approaches, the metrics may additionally and/or alternatively be included in a message output in response to a state of the predetermined platform changing during performance of the pattern-based configurable process sequence. Note that, in some approaches, the platform is caused to notify a user device of a user via a messaging system. This messaging system is preferably able to distinguish between notifications of different processes and other messaging systems that have respective users who may play a part in different process related groups/channels, e.g., such as to act upon a disconnected automation notification. In yet another of such approaches, the metrics may additionally and/or alternatively include, failure information associated with at least one of the steps. In some additional approaches, the metrics may additionally and/or alternatively include, e.g., a performance rating of devices used to perform the steps of the playbook, other devices that are available and not being used for performance the performance of the steps of the playbook, an operating system that is used to perform the steps of the playbook, an accuracy of an estimation made of how long running the playbook would take, a relative responsiveness history of users associated with manual actions in a disconnected state of the platform, a number of times that a second user was relied upon based on a first user not responding to a notification requesting that a manual action be performed, etc.

Information that is logged by the logger component may be extracted during the running of the playbook, e.g., see operation 322 of the pattern-based configurable process sequence. For example, it should be noted that, in some approaches, at least some of the steps are caused, e.g., instructed, to be performed at a client site, e.g., by a client endpoint device. Based on performance of one or more steps at such client sites, feedback detailing the performed steps, e.g., success, failure, predetermined performance metrics, etc., may be received by the tracker and/or logger components. In some other approaches, one or more of the steps may be caused to be run on account infrastructure, e.g., pre-check operation, patching operations, etc., which may be run on account infrastructure 394. Thereafter, in some approaches, the logger component may add the information to a secure file service, e.g., see operation 324, which may be configured to be audited by one or more user devices that have credentials to review the information. Note that, in some approaches, the tacker component may additionally and/or alternatively be caused to add the state information into the secure file service, e.g., see operation 374.

Method 300 preferably includes storing the template tracker file, a file including the log and the generated playbook in storage, e.g., a predetermined long term storage device, for enabling auditing of the pattern-based configurable process sequence. This information may, in some approaches, be pushed to the storage by the platform post completion of the process sequence steps. In one preferred approach, the storage includes an auditable file of the secure file service. This information of the file of the secure file service is preferably secure from unauthorized access. For example, a login interface may be output to at least one user interface of a user device for display thereon. In response to a determination that a predetermined valid user credentials are received for accessing the file of the secure file service, access may be granted to the file of the secure file service. In contrast, access is denied in response to a determination that valid user credentials have not been received.

Several benefits are enabled as a result of using the techniques described herein for determining such information and including such information in the auditable file of the secure file service. For example, these techniques allow for the elimination of a need to customize existing automation to meet the needs of the tools and technology. Instead, the pattern-based configurable process sequence is merely input into the predetermined platform, and as a result of running the generated playbook, components, e.g., the tracker component, the logger component, etc., are caused to extract and store information associated with running the steps of the playbook in the secure file service. Once in the secure file service, the information is easily auditable by authorized user devices. Accordingly, the techniques of approaches described herein allow a single pane of a user interface to be used with any existing webhook capable collaboration tool within the organization. Furthermore, these techniques allow even novice users to relatively easily understand, and audit information associated with the steps of the pattern-based configurable process sequence. This thereby reduces requirements for a relatively highly skilled user who would otherwise be responsible for training the novice users with respect to how to manually extract information from performance of process steps. This also eliminates the introduction of human error that is otherwise often introduced in manually determining metrics associated with an automated process. Accordingly, the techniques described herein proceed contrary to conventional wisdom, and benefit computer operation accuracies within the field of automated processes.

Method 300 also includes several operations that may be performed to cause the predetermined platform to enter in and out of one or more states during performance of the steps of the pattern-based configurable process sequence. The platform may be caused to maintain the runtime state and then transition to the offline state during performance of the steps in response to a determination that a disconnected manual action needs to be performed by a user. Method 300 may thereafter cause the platform to resume from a particular state thereby not holding any resources during the disconnected state.

In one example, the predetermined platform is caused to enter into an offline state during performance of steps of the pattern-based configurable process sequence in response to a determination that a next step of the pattern-based configurable process sequence includes a disconnected manual action. For context, a disconnected "manual" action may include an action that is not performed by the predetermined platform but is instead performed by a predetermined user. For example, the manual action may include a selection from a plurality of options that is made by a user with at least temporary credentials to make such a selection. In some approaches, in response to a determination that a next step includes a manual action e.g., see operation 336, method 300 may include triggering a notification workflow 340. In some approaches, the notification workflow 340 includes the manual action being performed. Information associated with the manual action may be used to determine whether the manual action is successfully performed. For example, in response to a determination that the manual action is successfully performed, e.g., as illustrated by logical path 348, during the predetermined platform being in the offline state, the predetermined platform may be caused to resume into a runtime state, e.g., see resume operation 346. The resume operation may trigger the process automation generator to be caused to initiate performance of a next step of the playbook, e.g., see operation 350. In some approaches, the resume operation 346 includes causing a resume sequence pattern to be performed, e.g. process_automation_wrapper_yml. The resume sequence pattern may, in some approaches, include adding at least some information, obtained as a result of the manual step being performed, to the file of the secure file service. The resume sequence pattern may additionally and/or alternatively include starting from a failed/next step, adding tracker reference information to the file and/or adding logger reference information to the file. Furthermore, in some approaches, upon transitioning from the offline state to the runtime state, e.g., in response to a determination that a confirmation has been received that the manual step has been successfully performed, the notification workflow and/or the offline state may be ended, e.g., see operation 352.

It should be noted that, in some preferred approaches, the predetermined platform does not hold any resources during the disconnected state. Instead, the predetermined platform may be at least temporarily set to a relatively low-power and/or low resource consuming state to preserve computing resources. In another approach, predetermined housekeeping operations are performed by the predetermined platform during this offline state. By reserving such housekeeping operations for the offline state, performance of a computer system performing method 300 is balanced, as operations, such as housekeeping operations, that may be at least temporarily suspended from being performed are reserved for times in which infrastructure logical and/or physical resources are relatively abundant. In fact, an inventor calculates that the techniques described herein will enable the surprising result of up to weeks of computer processing operations being reduced, where such computer processing operations would otherwise be performed by developers attempting to automate some pattern-based configurable process sequences.

As mentioned elsewhere above, in some approaches, the tracker component is configured to determine and collect information with regards to whether a most recently performed step is successful. Performance of a next step may, in some approaches, depend on whether it is determined that the most recently performed step was successfully performed. In some approaches, in response to a determination that the most recently performed step was successfully performed, a next step of the runbook may be initiated, in some approaches. In contrast, it may be determined that a step of the pattern-based configurable process sequence has failed during performance of steps of the pattern-based configurable process sequence. In response to a determination that a step of the pattern-based configurable process sequence has failed during performance of steps of the pattern-based configurable process sequence, a notification and/or information of the log that details the failure of the step may be output. Furthermore, in response to a determination that a step of the pattern-based configurable process sequence has failed during performance of steps of the pattern-based configurable process sequence, a predetermined process may be performed using the information for recovering from the failure of the step. In some more specific approaches, in response to a determination that the most recently performed step was not successfully performed, e.g., a determination is made that security patching operations failed to be successfully performed on virtual machines of an infrastructure, one or more predetermined mitigation actions may be performed, as will now be described below, e.g., see operation 342 continue to cause exception/error handing 344 to be performed. The exception/error handing may, in some approaches, include performing a predetermined intelligent recovery configuration 354. In some approaches, information associated with the failure is output to the intelligent recovery configuration 354, e.g., see operation 356. One or more recommendations for recovering from the failure may be received from the intelligent recovery configuration 354, e.g., see operation 358. The recommendation(s) for recovering from the failure may, in some approaches, be determined from a table of recommendations. For example, the information provided to the intelligent recovery configuration 354 may be pre-associated with one or more of the recommendations, and thereby identified from the table to be applicable remedies for the failure. In response to a determination that the intelligent recovery configuration 354 provides a recommendation, the offline state may be ended, e.g., see logical path 362 continue to operation 352. In contrast, the method optionally continues to block 360, e.g., see logical path 364, in some approaches, in response to a determination that such a recommendation is not provided. In some approaches, a failure of a manual step may be the fault of one or more users failing to perform an action that they have a duty, e.g., a job responsibility, to perform. Various techniques for recovering from such a failure are detailed in block 360, which will now be described below.

In some approaches, in response to a determination that a failure event has occurred with respect to one of the steps, a notification may be output to one or more predetermined user device(s). Furthermore, in some approaches, the platform may, additionally and/or alternatively be dropped into the offline state in response to the determination that a failure event has occurred with respect to one of the steps. The techniques of some approaches may anticipate a disconnected manual action, e.g., a disconnected manual action occurring within a predetermined number of steps. In some approaches, in response to a determination that the next step of the pattern-based configurable process sequence includes a disconnected manual action, a first notification is output to a first user device associated with a first user that is responsible for performing an action for the disconnected manual action, e.g., see notification output operation 366 of block 360. For example, in one approach, the first user may currently hold a role-based access control (RBAC) for causing the manual action to be performed. The first notification may, in some approaches, alert the user to the next step. In some other approaches, the first notification may additionally and/or alternatively request that the first user perform the manual action. In response to a determination that the manual action is performed by the first user, e.g., a confirmation is received from the first user device, the platform resumes the runtime state and performs a next of the steps. In some approaches, information detailing the success of the manual action and/or details about the manual action performed, e.g., timestamp information, processing resources used to perform the manual action, etc., may be added to the file of the secure file service by the logger and/or the tracker. For example, the information detailing the success of the manual action and/or details about the manual action performed are gathered and added to the file of the secure file service in operations 370, 372 and 374. Once the updates are performed, the method 300 may exit the workflow of block 360, e.g., see operation 376.

It should be considered that, in some approaches, a first user who currently holds an RBAC for causing the manual action to be performed may, for one reason or another, fail to perform the manual action. Method 300 includes optional operation to mitigate the performance loss that would otherwise be experienced as a result of waiting for the first user to respond to the notification. For example, in some approaches, it may be determined that the first user has not caused the manual action to be performed within a predetermined temporal threshold, e.g., a predetermined amount of time, a predetermined time widow of a twenty-four hour period, etc. In response to a determination that the first user has not caused the manual action to be performed within the predetermined temporal threshold, in some approaches, a second notification is output to a second user device associated with a second user. For example, the second notification may request that the second user cause the manual action to be performed and/or may notify the second user of the manual action not being performed within the predetermined temporal threshold. For some approaches in which the manual action is only able to be performed by a user with a predetermined RBAC, the second notification may include an at least temporary RBAC for causing the manual action to be performed. In response to a determination that the second user accepts the request to perform the manual action, method 300 may continue to operation 346 in response to a determination that the second user successfully causes the manual operation to be performed. In contrast, in response to a determination that the second user fails to accept the request to perform the manual action or fails to perform the manual action, method 300 follows logical path 378, and the process optionally ends, e.g., see operation 380. In some approaches, a subject matter expert (SME) 368 may review the failed manual operation, e.g., see reconsideration operation 382, and may optionally retrigger causing the manual operation to be performed, e.g., see retrigger operation 384. This retriggering may result in the notifications being resent to the user devices associated with the first and/or second users, or alternatively another predetermined user device. Information associated with approval or rejection of the manual action may be incorporated into the file of the secure file service, e.g., see operations 386 and 388.

The information stored in the file of the secure file service may, in some approaches, be transformed, e.g., see operation 390, into process metrics 392. For example, the process metrics may include a unique identifier per job process as different job identifications may exist to complete all of the steps of the entire pattern-based configurable process sequence. The information may additionally and/or alternatively be used to provide insights 396 about the pattern-based configurable process sequence, e.g., upon receiving a request for auditing such information. For example, in some approaches, method 300 includes receiving, from a first user device, a query for information associated with the pattern-based configurable process sequence. Information associated with the pattern-based configurable process sequence that fulfills the query is identified in the storage that includes the information. The identified information is thereafter output to the user device to fulfill the received query.

In some approaches, the operations of method 300 may be performed by an artificial intelligence (AI) model that is trained using a predetermined training set of data. For example, in some approaches, various of the operations noted above may be deployed in a trained state of a trained AI model. Training of the AI model, in some approaches, may be performed by applying a predetermined training data set to learn how to process the pattern-based configurable process sequence, extract information associated therewith, and store such data in a file of a secure file service, e.g., a secured memory component. Initial training may include reward feedback that may, in some approaches, be implemented using a subject matter expert (SME) that understands how a portion of the steps are processed with respect to the training data. However, as described elsewhere herein, to prevent costs associated with relying on manual actions, in another approach, reward feedback may be implemented using techniques for training a BERT model, as would become apparent to one skilled in the art after reading the present disclosure. Once a determination is made that the AI model achieves a redeemed threshold of accuracy of performing the operations described herein during this training, a decision that the model is trained and ready to deploy for use in the process automation generator 306 is made. In some further approaches, the AI model may be a neuromyotonic AI model that may improve performance of computer devices in the account infrastructure 394 because the neuromyotonic AI model may not need a subject matter expert and/or iteratively applied training with reward feedback in order to accurately perform operations described herein. Instead, the neuromyotonic AI model is configured to itself make determinations described in operations herein and identify and store associated information in the file of the secure file service thereafter. Weight values may, in some approaches, be used by the AI reasoning model to analyze information and/or feedback received by the process automation generator 306. Such AI models allow steps of a pattern-based configurable process sequence to be processed, where the scale of the pattern-based configurable process sequence would not otherwise be feasible for a human to perform. This is because based on the scale of typical environment architectures, management and automation of process steps is not able to be achieved by human manual actions. These models also streamline automation of the pattern-based configurable process sequence, as processing operations, operator costs, license costs, infrastructure costs, maintenance, code, dependences on external orchestrators, and skilled human interaction are all reduced as a result of the techniques described herein.

Several additional benefits are enabled as a result of implementing the techniques described herein. For example, the techniques described herein allow for reusability of existing automation by simple configuration without the need for customization. Furthermore, these techniques allow for relatively fast deployment of standard processes against different customers with different process needs and requirements using pattern sequences. An automation process may also be paused due to an induced occurrence or due to an exceptional issue occurrence and resume from the same point, e.g., see the transition between the offline and runtime states described elsewhere above. Yet furthermore, these techniques allow for relatively intelligent recovery via a configured intelligence when a failure, e.g., such as determined by a known error code occurrence, is observed by the platform.

These benefits equate to business value as a result of being deployed in a business architecture. For example, these techniques enable an ability to relatively quickly deploy a standard process automation customized to customer requirements with a simple configuration. There is also an enabled ability to reuse an existing automation without any changes by enacting simple mapping rules. Furthermore, there is an enabled ability to relatively quickly and easily derive insights from any process within a single dashboard. For example, as a result of performing operations described herein, audible information is thereafter readily available for using by customers associated with one or more steps of the process sequence. Automation assets across processes are also able to be upgraded to relatively latest versions with a single reference.

Figure 4A:
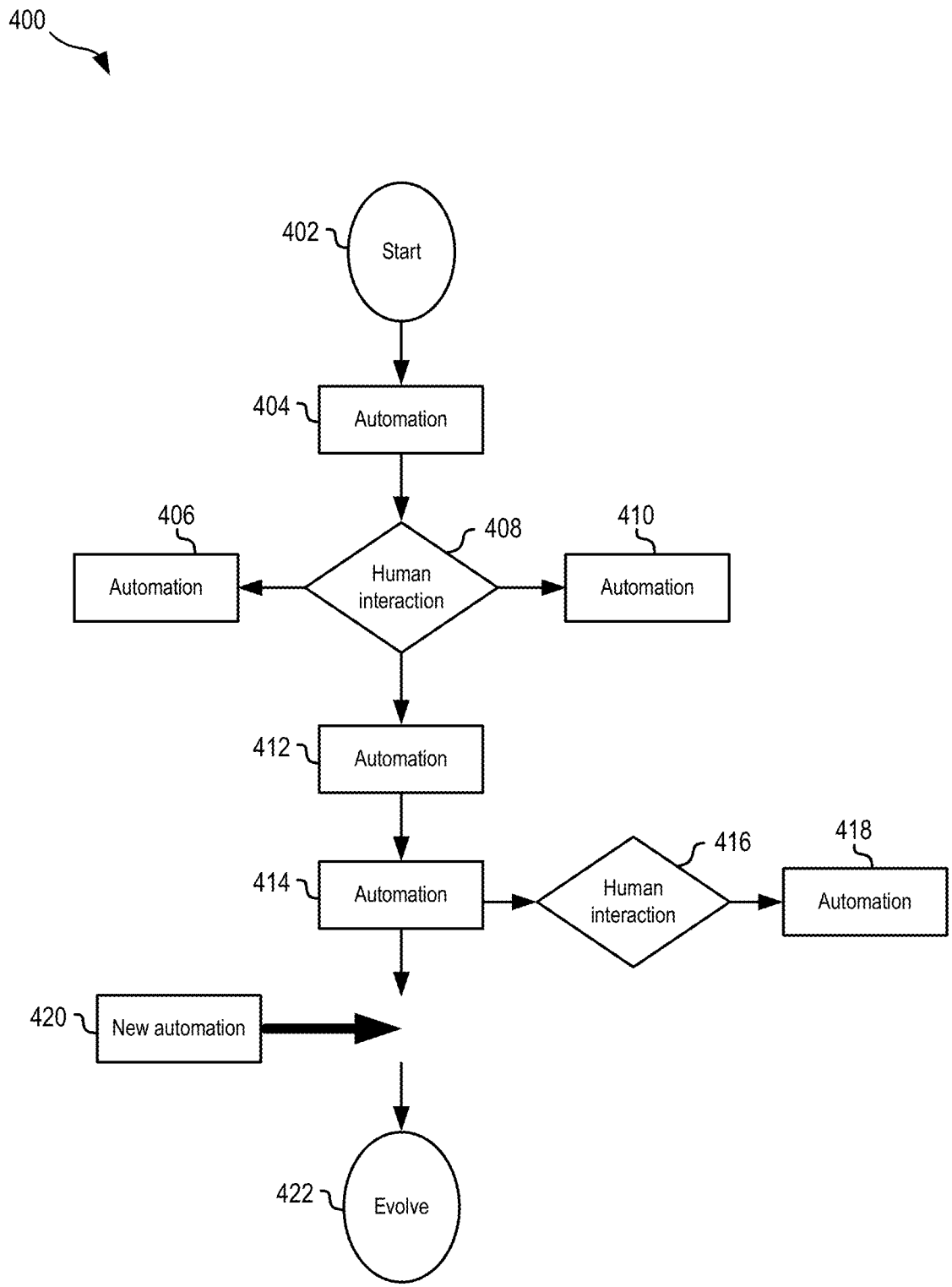
FIG. 4A is a flowchart of a method, in accordance with one approach of the present invention.

Now referring to FIG. 4A, a flowchart of a method 400 is shown, according to one approach. The method 400 may be performed in accordance with the present invention in any of the environments depicted in FIGS. 1-4B, among others, in various approaches. Of course, more or fewer operations than those specifically described in FIG. 4A may be included in method 400, as would be understood by one of skill in the art upon reading the present descriptions.

Each of the steps of the method 400 may be performed by any suitable component of the operating environment. For example, in various approaches, the method 400 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

The flowchart of method 400 depicts a process in which the techniques of one or more of the operations of method 300 described above may be used to enable an ability to scale automation into steps of a pattern-based configurable process sequence. This way, operations may be performed that enable an ability to start from 1% and easily scale to 100% automation in an iterative approach with dependence on orchestration tools or wrapper automations removed with a simple plug and play. For example, in some approaches, method 400 is initiated by inputting a pattern-based configurable process sequence into a predetermined platform, e.g., see Start operation 402. Operation 404 includes enabling automation of steps of the pattern-based configurable process sequence, e.g., plug automation. In some approaches, during automation of the steps, the predetermined platform is set in a runtime state and has access to resources of a predetermined account infrastructure. As steps of a playbook that is generated by a process automation generator are performed, additional automated steps are performed in method 400, e.g., see automation operation 412 and automation operation 414. In some approaches, automation steps may be identified, e.g., based on a received update, and added to the playbook to be performed. For example, new automation operation 420 is identified and added to the playbook to thereby enable the automation to evolve over time, e.g., see evolve operation 422. Similarly, one or more steps may be removed in some approaches, e.g., in response to a determination that the one or more steps are outdated and no longer needed.

In some approaches, during automation of the steps, the predetermined platform is set in an offline state, during which the predetermined platform does not have access to resources of the predetermined account infrastructure. For example, in response to a determination that a next step of the playbook includes a disconnected manual action, e.g., see human interaction operation 408 and human interaction operation 416, the platform may be set in an offline state. The predetermined platform may transition back to the runtime states in response to a determination, e.g., a notification is received, that the manual actions are successfully performed, e.g., see resume automated operations 406, 410 and 418. In some approaches, method 400 also enables features including existing collaboration tools, e.g., Slack, to be used as the user interface, thereby reducing the need to log in to production systems for debugging. These features may, in some approaches, be used to receive notifications described elsewhere herein and/or initiate an audit of information that is determined and stored during performance of method 400. For example, this information may include a template tracker file, a file including the log, a playbook, etc., which may be stored in storage for enabling auditing of the pattern-based configurable process sequence. An example of an audit trail that may be generated during performance of method 400 is described below, e.g., see FIG. 4B.

FIG. 4B depicts a representation 450 of an audit trail of the flowchart of FIG. 4A, in accordance with one approach. As an option, the present representation 450 may be implemented in conjunction with features from any other approach listed herein, such as those described with reference to the other FIGS. Of course, however, such representation 450 and others presented herein may be used in various applications and/or in permutations which may or may not be specifically described in the illustrative approaches listed herein. Further, the representation 450 presented herein may be used in any desired environment.

Representation 450 illustrates an audit trail of the flowchart of FIG. 4A, in accordance with one approach of the present invention. Information included in the audit trail may be caused to be collected, e.g., by a predetermined logger component, by a predetermined tracker component, etc., using techniques described elsewhere herein, e.g., see method 300. Note that the types of information included in the audit trail of representation 450 are non-exhaustive and are included for illustrative purposes.

Information 452 indicates that a process has been initiated, e.g., a pattern-based configurable process sequence is input into a predetermined platform. Information 454 indicates that a step, e.g., a job, of the process has been executed, and information 456 details timestamp information about when the job is successfully executed. Information 458 indicates timestamp information about when information from the logger component and the tracker component is pushed to a predetermined reporting server, e.g., for storage in a file of a secure file service, and information 460 confirms that the push is successfully performed. The information of the file of the secure file service may serve as a template for subsequent iterations of performing steps of the pattern-based configurable process sequence, e.g., see information 462 which indicates that the established job template is executed, and see information 464 which indicates that the established job template is successfully executed.

The audit trail of representation 450 may be output for display on a user device in response to receiving one or more queries for information. The audit trail of representation 450 may additionally and/or alternatively be output as a notification, e.g., to a user device of an administrator of an account infrastructure. The audit trail is useful in that even a novice user who reviews the information is able to understand a progress and success/failure of each of the steps of a process that is automated into a template and thereafter performed.

It will be clear that the various features of the foregoing systems and/or methodologies may be combined in any way, creating a plurality of combinations from the descriptions presented above.

It will be further appreciated that approaches of the present invention may be provided in the form of a service deployed on behalf of a customer to offer service on demand.

The descriptions of the various approaches of the present invention have been presented for purposes of illustration, but are not intended to be exhaustive or limited to the approaches disclosed. Many modifications and variations will be apparent to those of ordinary skill in the art without departing from the scope and spirit of the described approaches. The terminology used herein was chosen to best explain the principles of the approaches, the practical application or technical improvement over technologies found in the marketplace, or to enable others of ordinary skill in the art to understand the approaches disclosed herein.

What is claimed is:

1. A computer-implemented method, comprising:
    causing a predetermined tracker component to create a template tracker file based on a pattern-based configurable process sequence;
    causing a predetermined logger component to create a log of the pattern-based configurable process sequence;
    generating a playbook based on the pattern-based configurable process sequence;
    storing the template tracker file, a file including the log, and the playbook in storage for enabling auditing of the pattern-based configurable process sequence;
    outputting a first notification to a first user device associated with a first user that holds a role-based access control (RBAC) for causing a manual action to be performed; and
    in response to a determination that the first user has not caused the manual action to be performed within a predetermined temporal threshold, outputting a second notification to a second user device associated with a second user, wherein the second notification requests that the second user cause the manual action to be performed and/or notifies the second user of the manual action not being performed within the predetermined temporal threshold, wherein the first user device associated with the first user is distinct from the second user device associated with the second user.

2. The computer-implemented method of claim 1, comprising: inputting the pattern-based configurable process sequence into a predetermined platform; causing a predetermined automation generator to read the pattern-based configurable process sequence in response to the pattern-based configurable process sequence being input into the predetermined platform; and causing the automation generator to orchestrate steps of the pattern-based configurable process sequence into logical building blocks.

3. The computer-implemented method of claim 2, wherein the playbook includes the steps.

4. The computer-implemented method of claim 3, wherein causing the predetermined tracker component to create the template tracker file includes: instructing the predetermined tracker component to log a status for each of the steps based on data obtained by the predetermined tracker component.

5. The computer-implemented method of claim 3, wherein the log includes timestamps associated with the steps and predetermined metrics associated with the pattern-based configurable process sequence.

6. The computer-implemented method of claim 5, wherein the metrics are selected from the group consisting of: manual actions performed during an offline state of the predetermined platform, an identification of user(s) that performed the manual actions in the offline state, a message output in response to a state of the predetermined platform changing during performance of the pattern-based configurable process sequence, and failure information associated with at least one of the steps.

7. The computer-implemented method of claim 3, comprising: inputting the pattern-based configurable process sequence into a predetermined platform; causing the predetermined platform to enter into an offline state during performance of steps of the pattern-based configurable process sequence in response to a determination that a next step of the pattern-based configurable process sequence includes the manual action; and causing the predetermined platform to resume into a runtime state in response to a determination that the manual action is successfully performed during the predetermined platform being in the offline state.

8. The computer-implemented method of claim 7, wherein the first notification is output to the first user device in response to a determination that the next step of the pattern-based configurable process sequence includes the manual action.

9. The computer-implemented method of claim 1, wherein the second notification includes a temporary RBAC for causing the manual action to be performed.

10. The computer-implemented method of claim 1, comprising: receiving, from a first user device, a query for information associated with the pattern-based configurable process sequence; identifying information associated with the pattern-based configurable process sequence in storage that fulfills the query; and outputting the identified information to the user device.

11. The computer-implemented method of claim 1, comprising: in response to a determination that a step of the pattern-based configurable process sequence has failed during performance of steps of the pattern-based configurable process sequence, outputting a notification and/or information of the log that details the failure of the step; and performing a predetermined process using the information for recovering from the failure of the step.

12. A computer program product, the computer program product comprising a computer readable storage medium having program instructions embodied therewith, the program instructions executable by a computer to cause the computer to:
cause, by the computer, a predetermined tracker component to create a template tracker file based on a pattern-based configurable process sequence;
cause, by the computer, a predetermined logger component to create a log of the pattern-based configurable process sequence;
generate, by the computer, a playbook based on the pattern-based configurable process sequence; and
store, by the computer, the template tracker file, a file including the log, and the playbook in storage for enabling auditing of the pattern-based configurable process sequence;
output, by the computer, a first notification to a first user device associated with a first user that holds a role-based access control (RBAC) for causing a manual action to be performed; and
in response to a determination that the first user has not caused the manual action to be performed within a predetermined temporal threshold, output a second notification to a second user device associated with a second user, wherein the second notification requests that the second user cause the manual action to be performed and/or notifies the second user of the manual action not being performed within the predetermined temporal threshold, wherein the first user device associated with the first user is distinct from the second user device associated with the second user.

13. The computer program product of claim 12, comprising program instructions executable by the computer to cause the computer to: input, by the computer, the pattern-based configurable process sequence into a predetermined platform; cause, by the computer, a predetermined automation generator to read the pattern-based configurable process sequence in response to the pattern-based configurable process sequence being input into the predetermined platform; and cause, by the computer, the automation generator to orchestrate steps of the pattern-based configurable process sequence into logical building blocks.

14. The computer program product of claim 13, wherein the playbook includes the steps.

15. The computer program product of claim 14, wherein causing the predetermined tracker component to create the template tracker file includes: instructing the predetermined tracker component to log a status for each of the steps based on data obtained by the predetermined tracker component.

16. The computer program product of claim 14, wherein the log includes timestamps associated with the steps and predetermined metrics associated with the pattern-based configurable process sequence.

17. The computer program product of claim 16, wherein the metrics are selected from the group consisting of: manual actions performed during an offline state of the predetermined platform, an identification of user(s) that performed the manual actions in the offline state, a message output in response to a state of the predetermined platform changing during performance of the pattern-based configurable process sequence, and failure information associated with at least one of the steps.

18. The computer program product of claim 14, comprising program instructions executable by the computer to cause the computer to: input, by the computer, the pattern-based configurable process sequence into a predetermined platform; cause, by the computer, the predetermined platform to enter into an offline state during performance of steps of the pattern-based configurable process sequence in response to a determination that a next step of the pattern-based configurable process sequence includes the manual action; and cause, by the computer, the predetermined platform to resume into a runtime state in response to a determination that the manual action is successfully performed during the predetermined platform being in the offline state.

19. The computer program product of claim 18, wherein the first notification is output to the first user device in response to a determination that the next step of the pattern-based configurable process sequence includes the manual action.

20. The computer program product of claim 12, wherein the second notification includes a temporary RBAC for causing the manual action to be performed.

21. The computer program product of claim 12, comprising program instructions executable by the computer to cause the computer to: receive, by the computer, from a first user device, a query for information associated with the pattern-based configurable process sequence; identify, by the computer, information associated with the pattern-based configurable process sequence in storage that fulfills the query; and output, by the computer, the identified information to the user device.

22. The computer program product of claim 13, comprising program instructions executable by the computer to cause the computer to: in response to a determination that a step of the pattern-based configurable process sequence has failed during performance of steps of the pattern-based configurable process sequence, output, by the computer, a notification and/or information of the log that details the failure of the step; and perform, by the computer, a predetermined process using the information for recovering from the failure of the step.

23. A system, comprising:
a hardware processor; and
logic integrated with the processor, executable by the processor, or integrated with and executable by the processor, the logic being configured to:
cause a predetermined tracker component to create a template tracker file based on a pattern-based configurable process sequence;
cause a predetermined logger component to create a log of the pattern-based configurable process sequence;

generate a playbook based on the pattern-based configurable process sequence;

store the template tracker file, a file including the log, and the playbook in storage for enabling auditing of the pattern-based configurable process sequence;

output a first notification to a first user device associated with a first user that holds a role-based access control (RBAC) for causing a manual action to be performed; and in response to a determination that the first user has not caused the manual action to be performed within a predetermined temporal threshold, output a second notification to a second user device associated with a second user, wherein the second notification requests that the second user cause the manual action to be performed and/or notifies the second user of the manual action not being performed within the predetermined temporal threshold, wherein the first user device associated with the first user is distinct from the second user device associated with the second user.

* * * * *